US009842697B2

United States Patent
Park et al.

(10) Patent No.: US 9,842,697 B2
(45) Date of Patent: Dec. 12, 2017

(54) CAPACITOR HOUSING CASE WITH OUTPUT TERMINAL WITHDRAWN FORWARD FOR THE IMPROVED HEAT DISSIPATION AND LIGHTWEIGHT

(71) Applicant: NUINTEK CO., LTD., Chungcheongnam-do (KR)

(72) Inventors: Dae Jin Park, Choongcheongnam-do (KR); Young Won Jeon, Chungcheongnam-Do (KR); Ki Ju Han, Chungcheongnam-Do (KR); Jin A Park, Chungcheongnam-Do (KR)

(73) Assignee: NUINTEK CO., LTD., Chungcheongnam-Do (KR)

( * ) Notice: Subject to any disclaimer, the term of this patent is extended or adjusted under 35 U.S.C. 154(b) by 3 days.

(21) Appl. No.: 14/947,209

(22) Filed: Nov. 20, 2015

(65) Prior Publication Data

US 2017/0148570 A1    May 25, 2017

(51) Int. Cl.
*H01G 4/38* (2006.01)
*H01G 4/224* (2006.01)
*H01G 4/32* (2006.01)

(52) U.S. Cl.
CPC ............ *H01G 4/224* (2013.01); *H01G 4/32* (2013.01); *H01G 4/38* (2013.01)

(58) Field of Classification Search
CPC   H01G 9/008; H01G 9/08; H01G 9/42; H01G 4/08; H01G 4/32; H01G 4/38; H01G 9/045; H01L 25/16; H01L 25/126
See application file for complete search history.

(56) References Cited

U.S. PATENT DOCUMENTS

2008/0050645 A1* 2/2008 Kai ..................... B60L 11/1861
                                                      429/61

FOREIGN PATENT DOCUMENTS

KR         100400241       10/2003

* cited by examiner

*Primary Examiner* — Nguyen Ha
(74) *Attorney, Agent, or Firm* — IPLA P.A.; James E. Bame

(57) ABSTRACT

A capacitor housing case with output terminal withdrawn forward comprises: a rear plate for forming the placement space which is divided by division portion being projected longitudinally; a top plate which is vertically formed forward from a top of the rear plate; a bottom plate which is formed parallel to the top plate forward from a bottom of the rear plate; a side plate for forming the placement space having a front opening by coupling to both sides of the rear plate, a top plate and a bottom plate; and at least two fixed mount, which is exposed outside parallel to the rear plate, for having a fixation groove penetrating up and down; wherein a capacitor output terminal is extended through the front opening, and epoxy is inserted through the front opening, and the capacitor elements and the first, the second busbar-formed portion are epoxy molded.

4 Claims, 3 Drawing Sheets

CAPACITOR HOUSING CASE WITH OUTPUT TERMINAL WITHDRAWN FORWARD FOR THE IMPROVED HEAT DISSIPATION AND LIGHTWEIGHT

BACKGROUND

Exemplary embodiments of the present invention relates to a capacitor housing case with output terminal withdrawn forward for the improved heat dissipation and lightweight which has excellent heat dissipation and durability, thereby minimizing epoxy-molding amount to allow compact configuration in order to comply with vehicle lightweight trend.

In general, electrical capacitor, phase advanced capacitor and electronic capacitor, etc. are widely used in various industrial fields.

Plastic film such as polyethylene terephthalate (PET) resin, polypropylene (PP) resin, polyethylene naphthalate (PEN) resin, polycarbonate (PC) resin and a polyphenylene sulfide (PPS) resin is prepared as a dielectric substance, and a metal deposited film is wound on one or both sides of the plastic film, and on both sides of the deposited film zinc, zinc alloy, tin or primary zinc and secondary tin is thermal sprayed to make a thermal spray surface, thereby producing a capacitor element.

Since the capacitance of the capacitor varies according to the use of the capacitor, the number of capacitor elements (hereinafter, elements) connected to other N pole bus bar and P pole busbar is changed to make a capacitor. For a capacitor of a small capacity, small number of elements are connected, and for the high-capacity capacitor, a plurality of elements are connected.

Laid open patent No. 2001-0072178 (Panasonic) discloses a capacitor and a manufacture method thereof.

SUMMARY OF THE INVENTION

An object of the present invention is to provide a capacitor housing case which is excellent in heat dissipation and does not overheat in extended operation, thereby having good durability.

Another object of the present invention is to provide a capacitor housing case which minimizes epoxy molding amount by unique housing shape, in case it is used as an inverter capacitor for vehicles in line with the trend of vehicle lightweight, thereby minimizing weight of the product and satisfying customer needs for lightweight.

Another object of the present invention is to provide a capacitor housing case for keeping a plane shape of the bottom plate and for allowing easy mounting with other structures (for example, automobile inverter case).

Another object of the present invention is to provide a capacitor housing case which is capable of maximizing the product accuracy and operability by reducing transformation due to the cooling after the housing injection and by minimizing transformation of housing during the epoxy molding after capacitor assembly.

To achieve the above objects, the present invention provides a capacitor housing case with output terminal withdrawn forward comprising capacitor elements 100, on which dielectric film is wounded, having conductive thermal-spraying plane at both sides; a housing case having placement space H for the capacitor elements 100, and a first and a second busbar-formed portion 300 which are connected electrically to the thermal spraying plane of the capacitor elements 100, wherein the capacitor housing case further comprises a rear plate 10 for forming the placement space H which is divided by division portion 15 being projected longitudinally; a top plate 20 which is vertically formed forward from a top of the rear plate 10; a bottom plate 30 which is formed parallel to the top plate 20 forward from a bottom of the rear plate 10; a side plate 40 for forming the placement space H having a front opening F by coupling to both sides of the rear plate 10, a top plate 20 and a bottom plate 30; and at least two fixed mount 50, which is exposed outside parallel to the rear plate 30, for having a fixation groove 51 penetrating up and down; and a capacitor output terminal M is extended through the front opening F to insert epoxy through the front opening F, thereby epoxy-molding the capacitor elements 100 and the first, the second busbar-formed portion 300.

DETAILED DESCRIPTION OF THE INVENTION

Figure 1:
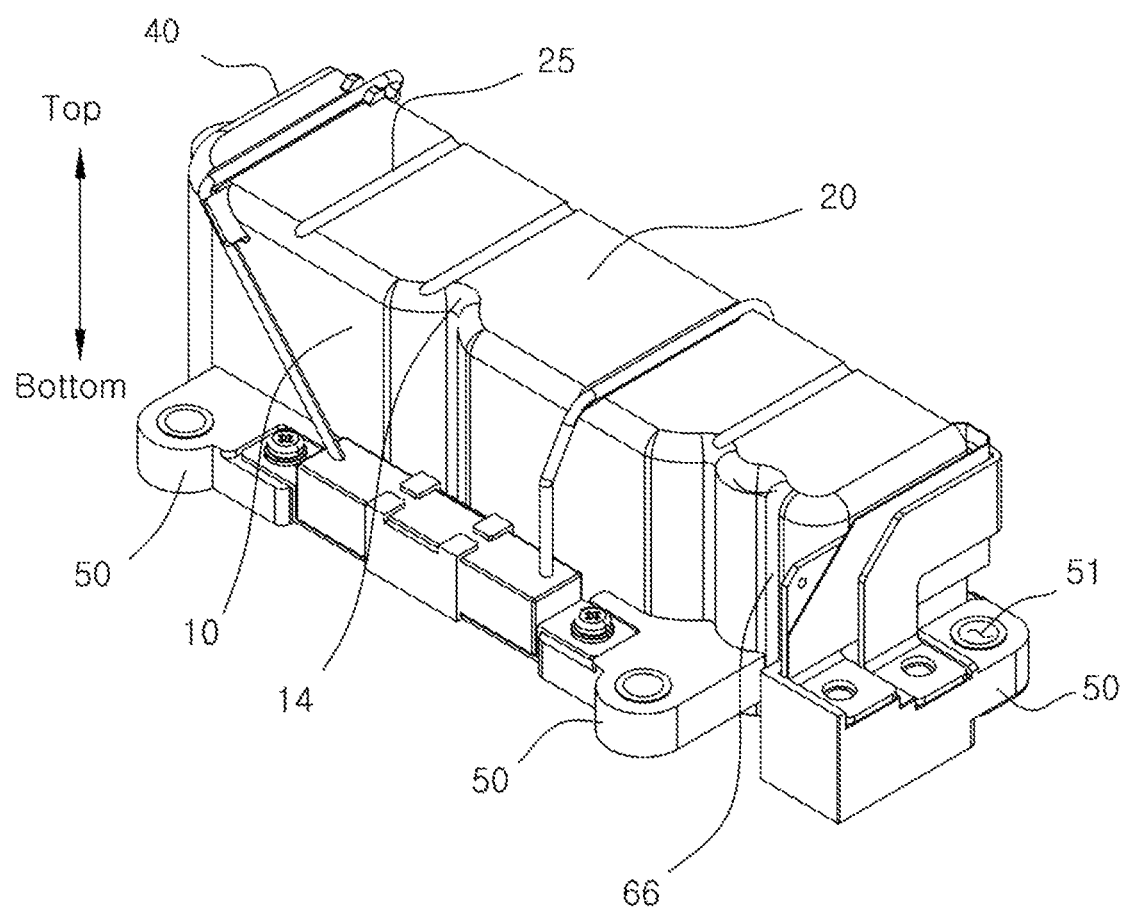
FIG. 1 is a rear perspective view of a capacitor housing case with output terminal withdrawn forward according to an embodiment of the present invention.

Hereinafter, embodiment of the present invention will be described in detail with respect to accompanying drawings.

As shown in FIGS. 1-4, a capacitor housing case with output terminal withdrawn forward according to an embodiment of the present invention relates to a capacitor housing case comprising capacitor elements 100, on which dielectric film is wounded, having conductive thermal-spraying plane at both sides; a housing case having placement space H for the capacitor elements 100, and a first and a second busbar-formed portion 300 which are connected electrically to the thermal-spraying plane of the capacitor elements 100.

As shown in FIGS. 1-4, the capacitor housing case with output terminal withdrawn forward according to the embodiment of the present invention comprises a rear plate 10 for forming the placement space H which is divided by division portion 15 being projected longitudinally; a top plate 20 which is vertically formed forward from a top of the rear plate 10; a bottom plate 30 which is formed parallel to the top plate 20 forward from a bottom of the rear plate 10; a side plate 40 for forming the placement space H having a front opening F by coupling to both sides of the rear plate 10, a top plate 20 and a bottom plate 30; and at least two fixed mount 50, which is exposed outside parallel to the rear plate 30, for having a fixation groove 51 penetrating up and down.

The capacitor output terminal M is exposed through the front opening F, and epoxy is inserted through the front opening F, and the capacitor elements 100 and the first and the second busbar-formed portion 300 are epoxy molded.

As shown in FIGS. 1-4, the capacitor housing case with output terminal withdrawn forward according to the embodiment of the present invention, the division portion 15 of the rear plate 10 comprises a slope 12 for projecting inclined upward on the rear plate 10; a ridge 13 being formed by a top of the slope 12; and a groove 14 being formed concave by an backside of the slope 12.

The groove 14 on the backside of the rear plate 10 is formed parallel to a penetration direction of the fixation groove 51, and the flat bottom plate 30 is coupled with a structure through a fixation mount 50. The heat dissipation of the capacitor is desirably increased by the slope 12 and the ridge 13 inside the rear plate 10 and the groove 14 outside the rear plate 10. Epoxy-molding amount in the capacitor is desirably reduced by the projection amount of the slope 12 and the ridge 13.

As shown in FIG. 1-FIG. 4, in the capacitor housing case with output terminal withdrawn forward according to the embodiment of the present invention, the housing case further comprises a Y capacitor mounting portion 60 formed at a side thereof and the Y capacitor mounting portion 60 comprises a first and a second Y capacitor groove h1,h2 in which two Y capacitor elements 51,52 are placed; a first auxiliary wall 61 between the first and the second Y capacitor groove h1, h2 and the placement space H; and a second auxiliary wall 63 placed between the first, the second Y capacitor groove h1, h2.

As shown in FIG. 1-FIG. 4, in a capacitor housing case with output terminal withdrawn forward according to an embodiment of the present invention, a second rear plate end portion 10b, where the Y capacitor S1,S2 is located, is placed further ahead than a first rear plate end portion 10a where the capacitor element 100 is located, thereby forming a gap GAP1. Therefore, it reduces space of the first and the second Y capacitor groove h1, h2 which is occurred because the Y capacitor S1,S2 is smaller than the capacitor element 100, thereby desirably reducing epoxy-molding amount.

It is preferable that the present invention comprises a second portion 65 including a second slope and a second ridge between the first and the second Y capacitor groove h1,h2, and also comprises a second groove 66 formed concave by a backside of the second division portion 65.

Figure 4:
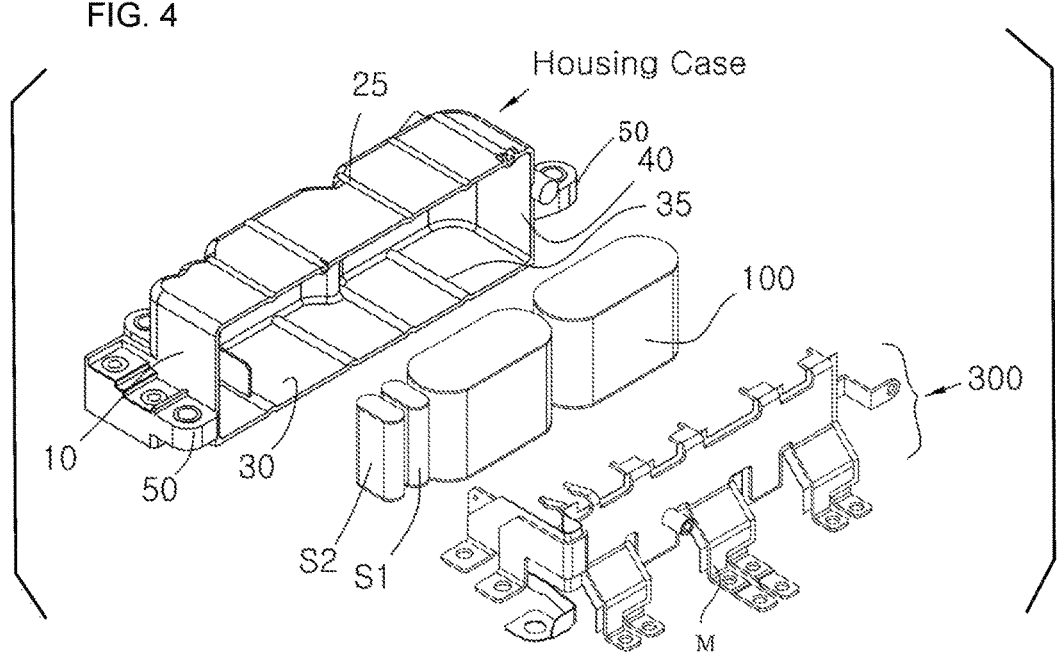
FIG. 4 is a view in use of the capacitor housing case with output terminal withdrawn forward according to the embodiment of the present invention.

As shown in FIG. 4, in a capacitor housing case with output terminal withdrawn forward according to an embodiment of the present invention, a first and a second reinforcement bars 25,35 are formed forward and backward parallel to each other respectively on the top plate 20 and the bottom plate 30. Shape of a transverse section of the vertical reinforcement bars 25 is preferably one selected from a semicircle, "U" shape, " ⌐ " shape, "V" shape or a sharp needle shape.

Figure 3:
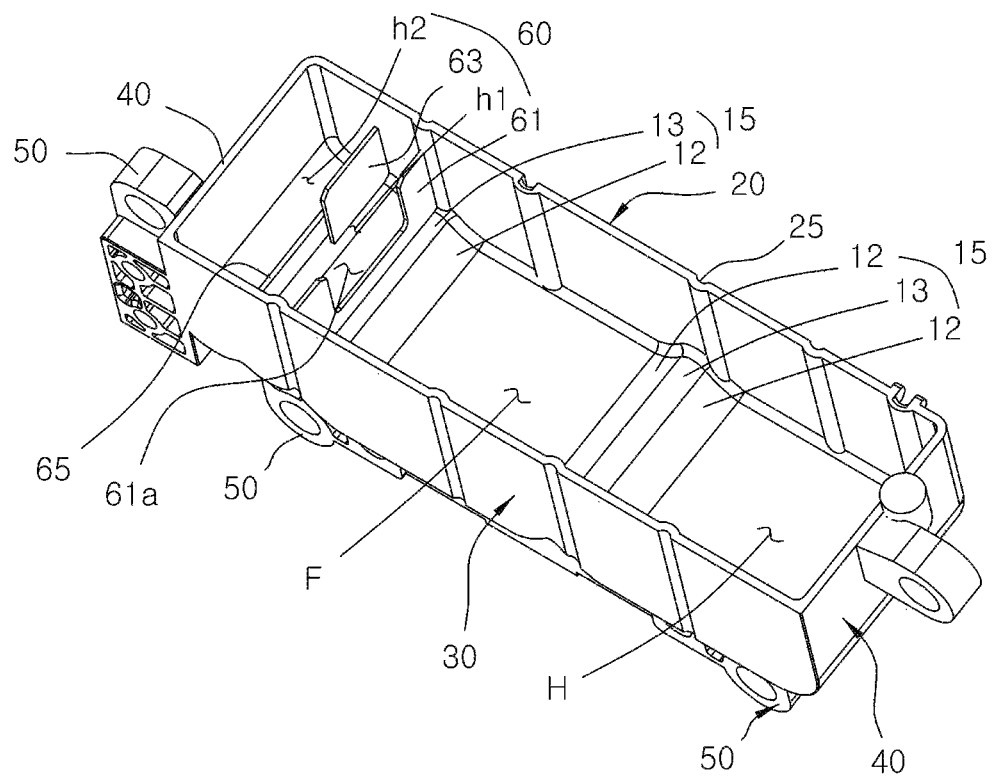
FIG. 3 is an internal structural view of the capacitor housing case with output terminal withdrawn forward according to the embodiment of the present invention.

As shown in FIG. 3, it is preferable that the first auxiliary wall 61, which is formed between the first and the second Y capacitor groove h1,h2 and the placement space H, further comprises an epoxy flow groove 61a in the first auxiliary wall 61 in order that fluid epoxy stuck in the placement space H during epoxy molding flows in the first and the second Y capacitor groove h1,h2.

Figure 2:
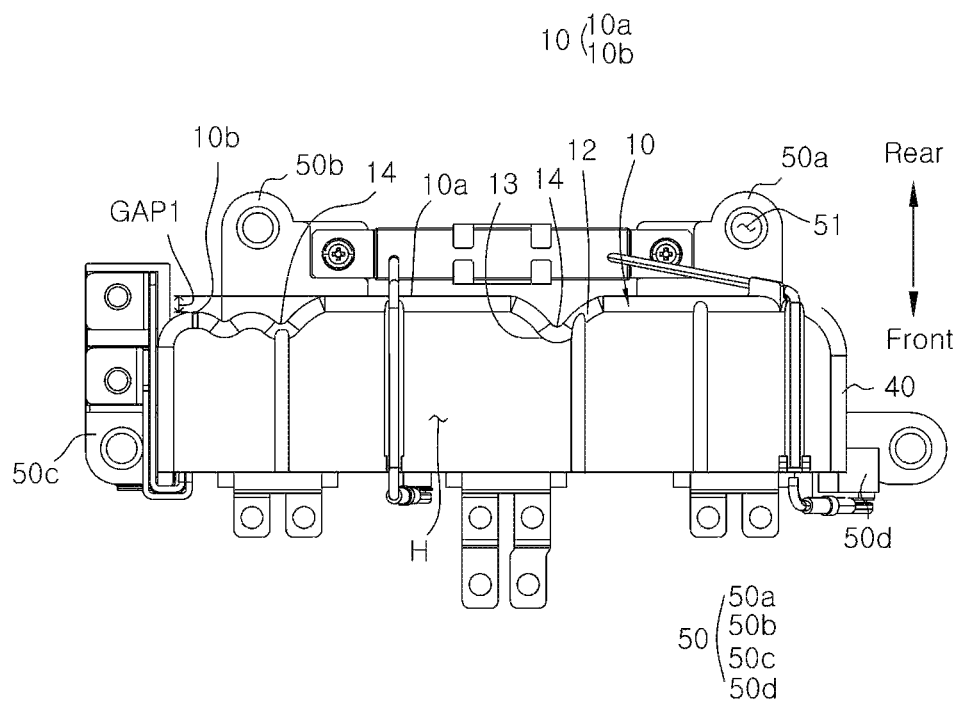
FIG. 2 is a plane view of the capacitor housing case with output terminal withdrawn forward according to the embodiment of the present invention.

As shown in FIG. 2, the fixation mount 50 having a fixation groove 51 comprises preferably a first and a second fixation mount 50a, 50b extended to the outside vertically to the rear plate 10 and a third and a fourth fixation mount 50c, 50d extended to the outside vertically to the side plate 40.

While the present invention has been described with respect to the specific embodiments, it will be apparent to those skilled in the art that various changes and modification may be made without departing from the spirit and scope of the invention as defined in the following claims. The inclusion of reference numerals does not limit the scope of the claims.

What is claimed is:

1. A capacitor housing case with a capacitor output terminal withdrawn forward comprising:
   capacitor elements (100), on which a dielectric film is wounded, having a conductive thermal spraying plane at both sides;
   a housing case having placement space (H) for the capacitor elements (100), and a busbar-formed portion (300) connected electrically to the thermal spraying plane of the capacitor elements (100);
   the capacitor housing case further comprising:
   a rear plate (10) for forming the placement space (H) which is divided by a first division portion (15) being projected longitudinally;
   a top plate (20) extending from a top of the rear plate (10);
   a bottom plate (30) extending from a bottom of the rear plate (10) and parallel to the top plate (20);
   side plates for forming the placement space (H) having a front opening (F);
   at least two fixed mounts exposed outside parallel to the rear plate, for having a fixation groove (51) penetrating up and down, and the capacitor output terminal ( ) extended through the front opening (F) to insert epoxy through the front opening, thereby epoxy-molding the capacitor elements (100) and the busbar-formed portion (300);
   a Y capacitor mounting portion (60) formed at a side thereof wherein the Y capacitor mounting portion (60) comprises:
   a first, a second Y capacitor groove (h1, h2) in which two Y capacitor elements (S1,S2) are placed;
   a first auxiliary wall (61) between the first, the second Y capacitor groove (h1, h2) and the placement space; and
   a second auxiliary wall (63) placed between the first, the second Y capacitor groove (h1, h2);
   wherein the first division portion (15) of the rear plate (10) comprises:
   a slope (12) for projecting inclined upward on the rear plate (10);
   a ridge (13) being formed by a top of the slope (12);
   a groove (14) being formed concave by a backside of the slope (12), and
   the groove (14) on the backside of the rear plate (10) formed parallel to a penetration direction of the fixation groove (51), and the bottom plate (30) coupled with a structure through the fixed mounts (50), thereby increasing heat dissipation of a capacitor by the slope (12) and the ridge (13) inside the rear plate (10) and the groove (14) outside the rear plate (10), and thereby reducing epoxy molding amount in the capacitor.

2. The capacitor housing case of claim 1 further comprising a Y capacitor mounting portion (60) formed at a side thereof,
   wherein the Y capacitor mounting portion (60) comprises:
   a first and a second Y capacitor grooves (h1, h2) in which two Y capacitor elements (S1,S2) are placed; and
   an auxiliary wall (61) between the first, the second Y capacitor grooves.

3. The capacitor housing case of claim 1, wherein the auxiliary wall (61) further comprises an epoxy flow groove (61a) in the auxiliary wall (61).

4. The capacitor housing case of claim 1, wherein a first and a second reinforcement bars (25, 35) are formed forward and backward parallel to each other respectively on the top plate (20) and the bottom plate (30).

* * * * *